No. 867,835. PATENTED OCT. 8, 1907.
W. PERVENKO.
LOCOMOTIVE TRUCK.
APPLICATION FILED JAN. 23, 1906.

2 SHEETS—SHEET 1.

No. 867,835. PATENTED OCT. 8, 1907.
W. PERVENKO.
LOCOMOTIVE TRUCK.
APPLICATION FILED JAN. 23, 1906.

2 SHEETS—SHEET 2.

WITNESSES
Paul A. Blair.
Walter Abbe

INVENTOR
Wassily Pervenko
BY
Howson and Howson
ATTORNEYS

UNITED STATES PATENT OFFICE.

WASSILY PERVENKO, OF ST. PETERSBURG, RUSSIA.

LOCOMOTIVE-TRUCK.

No. 867,835.　　　　　Specification of Letters Patent.　　　　　Patented Oct. 8, 1907.

Application filed January 23, 1906. Serial No. 297,511.

*To all whom it may concern:*

Be it known that I, WASSILY PERVENKO, a subject of the Emperor of Russia, residing in St. Petersburg, Russia, have invented certain new and useful Improvements in Locomotive-Trucks, of which the following is a full, clear, and exact specification.

The object of my invention is to provide a suitable spring coupling between the engine frame and the truck carrying the shaft of a rotary driving wheel, the axles of such wheel and of the running wheels on which it operates, and also means for raising such rotary driving wheel from contact with the running wheels.

Figure 1:
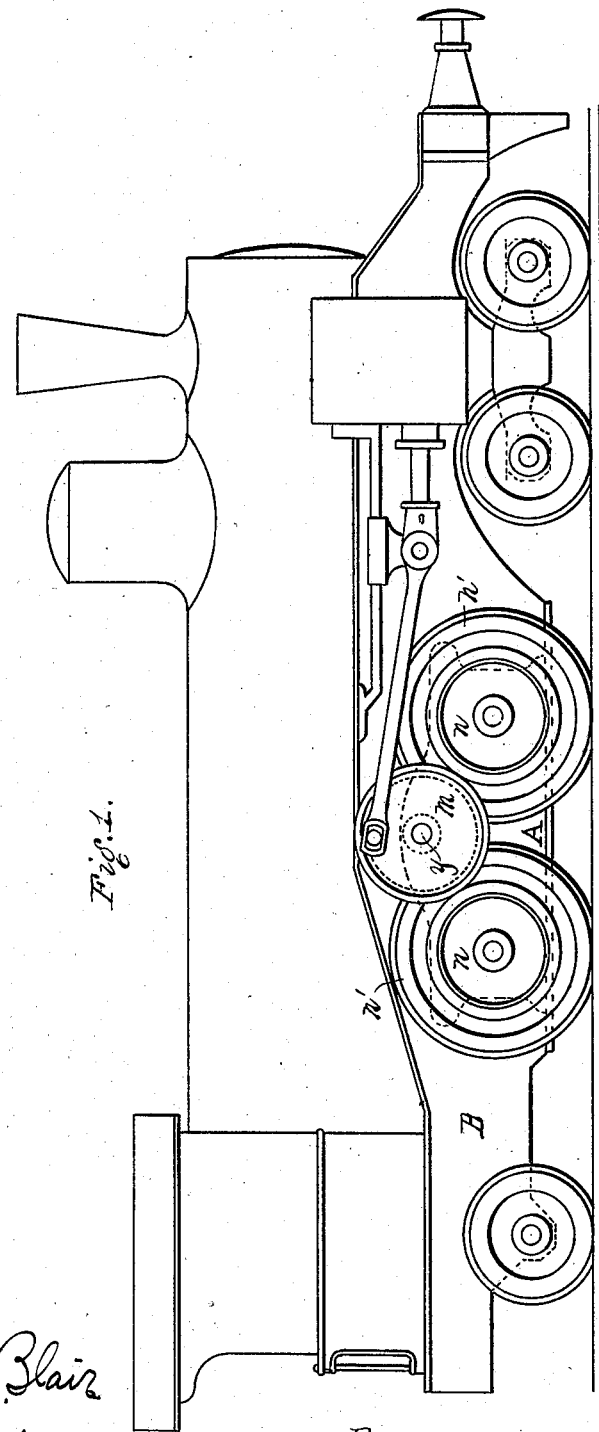
Figure 2:
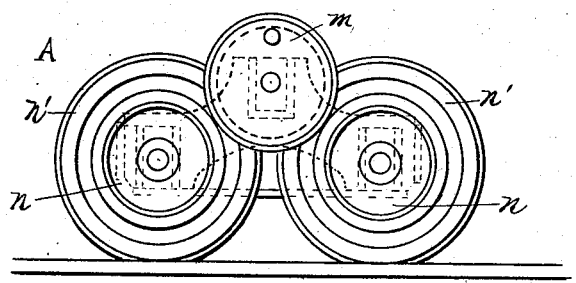
Figure 4:
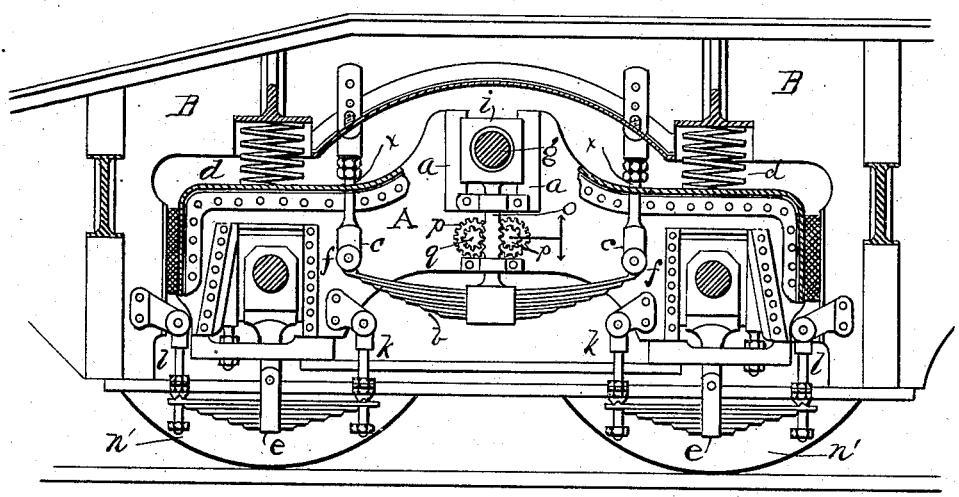
Figure 3:
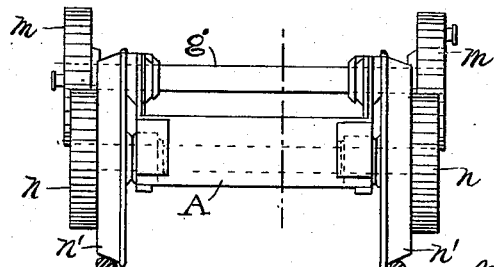

In the accompanying drawings Figure 1 represents a side view of a locomotive provided with my improved truck; Fig. 2 represents a side view, and Fig. 3 an end view of the truck separate; and Fig. 4 is the truck partly in section and on an enlarged scale.

The truck A should be constructed according to the general requirements of solidity, and may be built of either cast steel or of steel plates. My means of coupling this truck to the engine frame consists in employing two groups of springs, one conveying a portion of the weight of the frame directly to the axle of the rotary driving wheel $m$, and the other conveying the rest of the weight of the engine frame to the truck A itself and to the axles of the running wheels $n, n$. The mechanism which serves to lift the rotary driving wheel from the flanges of the runners, operates also to shift the load carried by the axle of the driving wheel when it is in contact with the running wheels, to the truck when such driving wheel has been lifted by such mechanism.

The portion of the weight carried by the shaft of the driving wheel when the latter is in contact with the running wheels may be transmitted thereto by means of rods $x$ secured to the engine frame at their upper ends and resting at the lower ends upon the ends of a spring $b$ and fastened thereto by bolts $c$. The spring $b$ is suspended from the journal box $i$ of the shaft $g$ of the rotary driving wheel by means of a toothed bar $o$.

The portion of the weight of the locomotive carried by the truck A and thence to the axes of the running wheels $n, n$, is transmitted by means of a double set of springs. One of these sets may be composed of compensating springs $d, d$, one at each end of the truck and interposed between it and the engine frame, to which such springs are suitably attached. The other set of springs consists of balancing springs $e, e$, suitably suspended from the journal boxes of the running wheels $n, n$, and receiving the weight transmitted to the bars $l$ and $k$, the bar $l$ being attached at its lower end to one end of the spring and at its upper end to the engine frame, and the bar $k$ being fastened at its lower end to the other end of the spring $e$ and at its upper end to the truck A. The weight of the truck as well as that of a portion of the locomotive so communicated is thus transmitted to the journal boxes of the running wheels.

That portion of the weight which is carried by the shaft of the rotary driving wheel when in contact with the annular flanges of the running wheels, is transferred to the truck when the mechanism which lifts the shaft of the driving wheel is operated. This mechanism is as follows: Close to the toothed bar $o$ connecting the journal box $i$ of the shaft of the driving wheel with the spring $b$ (Fig. 4), there are arranged on each side of the engine two pairs of toothed wheels; the large wheels $p, p$, gear with each other, and the smaller ones $q, q$, gear with the toothed bar $o$. Upon rotation of the wheels in one direction (by any suitable means controlled from the engine cab) the axle $g$ would be lifted up; while upon rotation in the opposite direction it would be let down. Upon rotation in the direction which elevates the axle $g$, the weight previously sustained by it and transmitted through the driving wheel to the running wheels, is transferred to the truck through the axes of the toothed wheels $p$ and $q$. The entire weight of the engine is thus communicated to the axles of the running wheels from the truck through the springs $e$ during the time that the driving wheel is raised from its contact with the runners.

It may be noted also that by this mechanism not only may the rotary driving wheel be lifted from the running wheels, but when in contact with the latter an artificial load may be added by operating the cog wheels $p$ and $q$ so as to pull the toothed bar $o$ downward.

I claim as my invention

1. In a traction engine, having an engine frame and a rotary driving wheel, a spring coupling between the engine frame and the shaft of the driving wheel.

2. In a traction engine having an engine frame, a rotary driving wheel and a truck carrying such driving wheel, in combination with spring couplings between said engine frame, the shaft of said driving wheel, and the truck carrying such driving wheel.

3. In a traction engine having an engine frame, a rotary driving wheel and a wheeled truck carrying said driving wheel, a spring coupling between the engine frame and the shaft of the driving wheel, a spring coupling between the engine frame and the truck, and a spring coupling between the engine frame, the truck and the running wheels of the truck, substantially as described.

4. In a traction engine having a rotary driving wheel, a shaft for such wheel vertically slidable, a toothed bar connecting with said shaft and a double pair of toothed wheels on stationary revoluble axes, one pair on each side of and one wheel of each pair gearing with the teeth of said bar, the other wheels gearing with each other.

In testimony whereof, I have signed my name to this specification in the presence of two subscribing witnesses.

WASSILY PERVENKO.

Witnesses:
　H. A. LOVIAGUINE,
　N. TSCHEUATEEFF.